Oct. 8, 1963  M. G. CHARLES  3,106,222
VALVED COUPLING
Filed Feb. 29, 1960  2 Sheets-Sheet 1

INVENTOR
MAYNARD G. CHARLES
BY
ATTORNEY

Oct. 8, 1963  M. G. CHARLES  3,106,222
VALVED COUPLING
Filed Feb. 29, 1960  2 Sheets-Sheet 2
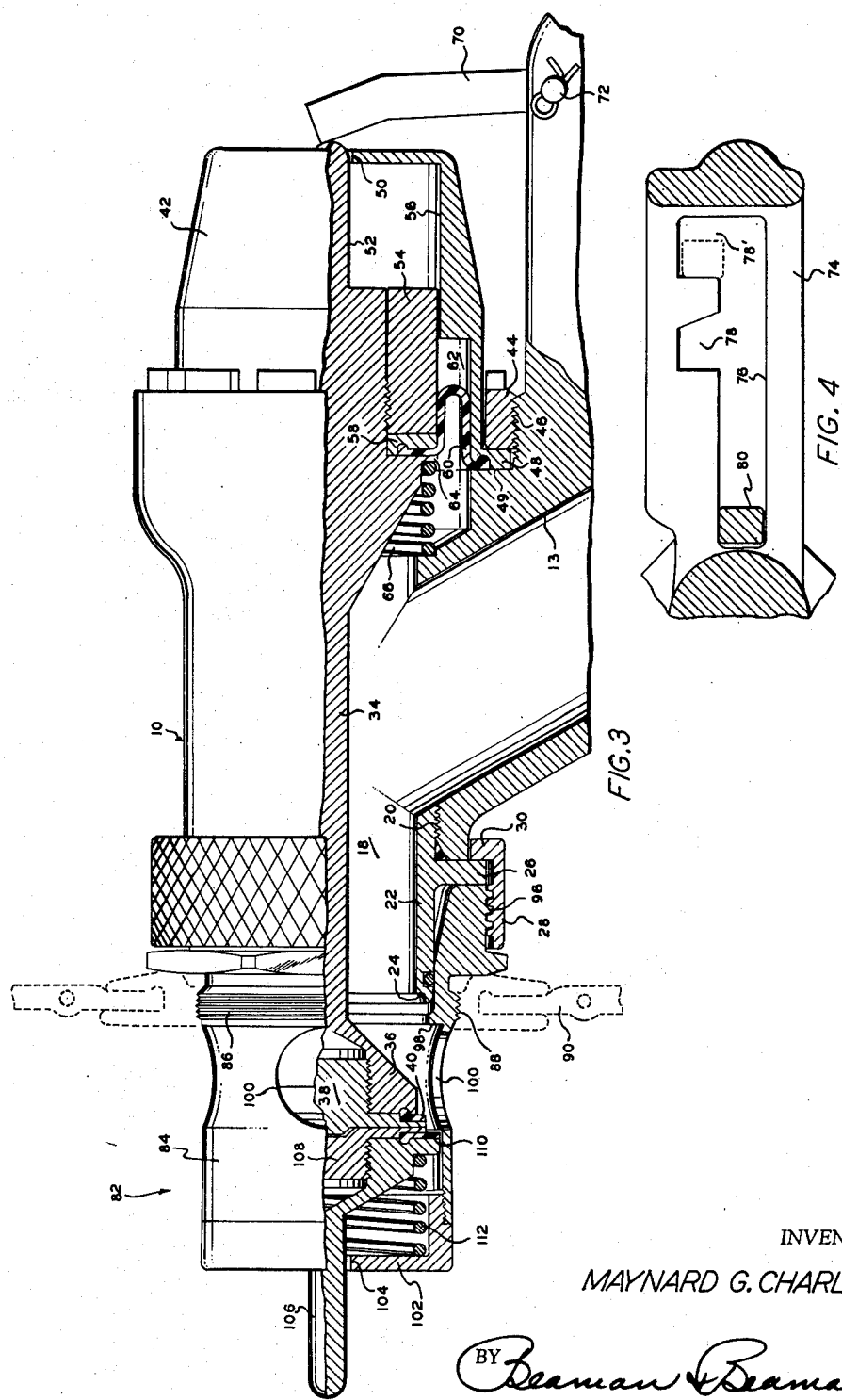
INVENTOR
MAYNARD G. CHARLES
BY Beaman & Beaman
ATTORNEY

United States Patent Office 3,106,222
Patented Oct. 8, 1963

3,106,222
VALVED COUPLING
Maynard G. Charles, Napoleon, Mich., assignor to Aeroquip Corporation, Jackson, Mich., a corporation of Michigan
Filed Feb. 29, 1960, Ser. No. 11,792
2 Claims. (Cl. 137—614)

The invention relates to valve structure and particularly pertains to a manually operated valve combined with self-sealing coupling apparatus.

Railroad tank cars, flexible walled storage tanks, and other liquid storage means often are filled from manually operated valves affixed to the end of a flexible supply line, usually a rubber hose. Normally, the valve is provided with a conventional nozzle wherein the nozzle is inserted into an inlet orifice and the fluid is allowed to flow into the open tank. However, when handling highly volatile fuels or when using flexible walled containers, it is often desirable or necessary to attach the valve to the container in a manner whereby exposure to at atmosphere is minimized or prevented entirely. The invention is directed to valves for use with this type of closed system, and though not limited to such application, the invention was particularly designed for use with flexible walled bag fluid containers.

It is thus an object of the invention to provide a manually operated valve which is rugged in construction and may be employed in a closed transfer system.

Another object of the invention is to provide a manually operated valve construction wherein the valve may be attached to the container being filled, and the flow of liquid through the valve may be regulated as desired.

A further object of the invention is to provide a manually operated valve wherein the fluid pressure within the valve body aids in maintaining the valve closed.

Yet another object of the invention is to provide a manually operated valve for use with a self-sealing coupling container fitting, wherein manual actuation of the valve component to the open position simultaneously opens the valve of the container fitting.

A further object of the invention is to provide a manually operated valve which is capable of handling very viscuous fluids, is easily cleaned, and creates little resistance to the flow of fluids therethrough.

Figure 1:
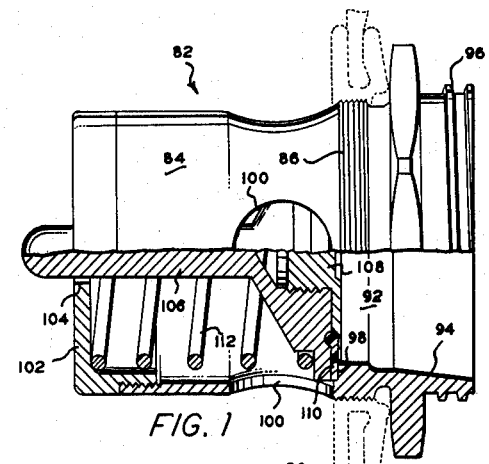
Figure 2:
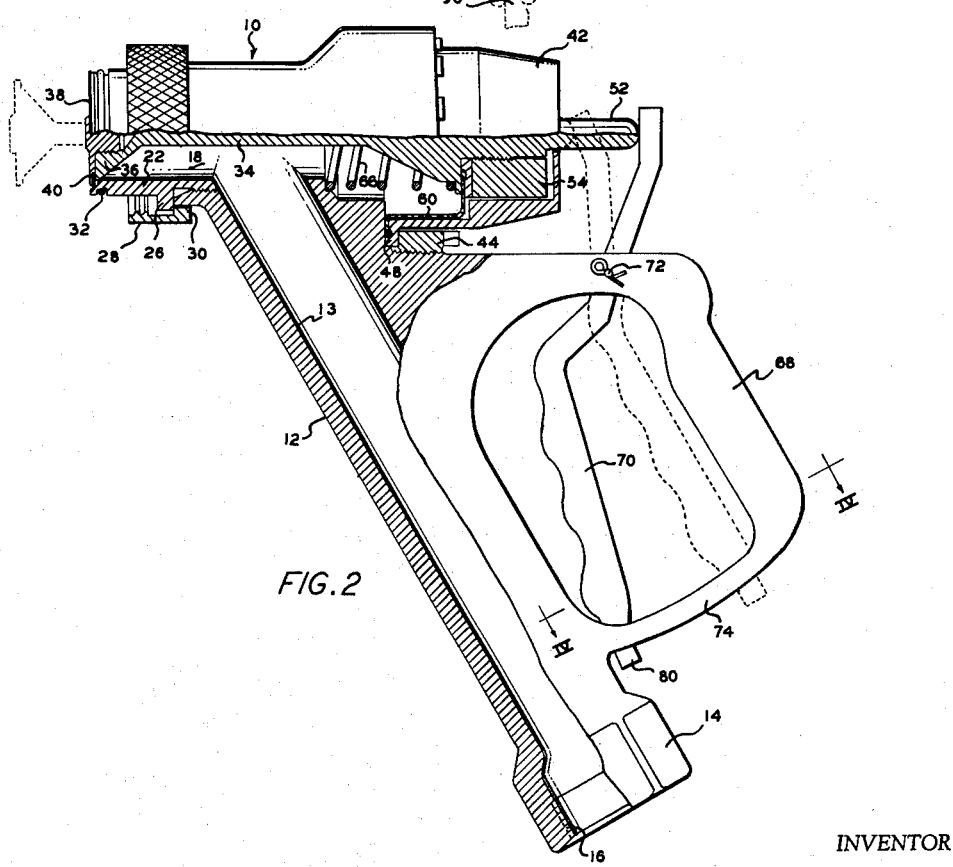

These and other objects of the invention will become apparent from the following description and accompanying drawings, wherein:

FIG. 1 is an elevational view, partly in section, of the self-sealing coupling container fitting, FIG. 2 is an elevational view, partly in section, of a manually operable valve in accord with the invention, wherein the components are shown in the closed position, FIG. 3 is an elevational view, partly in section, of the manually operated valve in accord with the invention as assembled to the container fitting, wherein the valve components are in the open position, and FIG. 4 is a sectional view taken along IV—IV of FIG. 2.

While the valve of the invention was constructed for the particular use of filling flexible walled container tanks, its use is not limited thereto, and the invention may be employed in any conventional application wherein it is desired to transfer fluid from a supply conduit to another fluid containing element.

The construction of the manually operated valve of the invention is best shown in FIG. 2, wherein it will be noted that the body 10 is provided with a substantially cylindrical section 12 having an axial bore 13 therethrough. The end of the section 12 is provided with hexagonal flats 14 and the lower end of the bore is threaded at 16 for affixing the valve and bore in fluid communication with a supply hose or conduit, not shown. The upper portion of the body 10 is provided with a bore 18 angularly disposed to the bore 13 and in communication therewith. The body 10 is annularly threaded at 20 to permit a tubular valve seat sleeve 22 to be affixed to the body 10 concentric to the bore 18.

The valve seat sleeve 22 is provided with an annular valve seat surface 24, disposed at right angles to the axis of bore 18, and the sleeve is also provided with an exterior annular flange 26. The flange 26 is for the purpose of maintaining the knurled nut 28 upon the valve body. As will be apparent from FIGS. 2 and 3, the nut 28 is provided with an inwardly directed flange 30 which is of a diameter less than the flange 26 whereupon the nut 28 may be assembled upon the body at the time the valve seat sleeve is affixed thereto. A groove and O-ring 32 are provided in the exterior surface of the valve seat sleeve adjacent the end thereof to facilitate sealing with the container fitting, as will be later apparent.

An axially movable valve stem 34 is located within the bore 18 and has a valve head 36 affixed to the left end, as viewed in FIGS. 2 and 3. A seat retainer 38 is threadedly fixed to the valve head 36 whereupon the retainer and valve head maintain an annular sealing ring 40 in position for engagement with the valve seat 24. When the valve stem is in the rightmost position, as shown in FIG. 2, the ring 40 will be in sealing engagement with the sleeve seat 24.

The support for the valve stem 34 consists of an annular cap 42 which is removably fixed to the valve body 10 by a spanner wrench operated threaded ring 44 cooperating with valve body threads 46. The ring 44 abuts against a flange 48 of the cap 42, maintaining the cap accurately located on the body shoulder 49, FIG. 3. A hole 50 is provided in the cap, permitting the projection 52 of the valve stem 34 to extend therethrough for cooperation with the valve actuation lever, as will be later described.

An annular sleeve 54 is threadedly fixed to the valve stem and slidably engages the bore 56 of the cap 42 providing support and guidance for the valve stem movement. The sleeve 54 also functions to maintain the annular diaphragm ring 58 in position, whereby introduction of the inner periphery of a flexible diaphragm 60 into the complementary recess formed in the ring 58 seals the diaphragm to the valve stem due to the compression of the diaphragm between the ring and valve stem. The outer periphery of the annular diaphragm 60 is received within an annular groove defined in the cap flange 48, whereupon the assembly of the cap 42 upon the valve body also maintains the diaphragm within the groove and compresses the outer diaphragm periphery between the cap and shoulder 49 thereby affixing the diaphragm to the valve body. It will thus be appreciated that the diaphragm 60 is annularly disposed about the valve stem providing a sealing engagement between the valve stem and valve body. The cap is recessed at 62 to provide clearance and support for the diaphragm.

An annular lip 64 defined on the valve stem 34 serves as the valve stem anchor for a spring 66 interposed between the valve stem and a shoulder formed on the valve body 10. The spring 66 is of the compression type and continually biases the valve stem 34 to the right, as viewed in the drawings.

A handle portion 68 is defined on the valve body 10, and a finger actuated lever 70 is pivotably mounted to the body at 72, and extends upwardly to abut the end of the valve stem projection 52. Thus, upon the operator gripping the handle and squeezing or releasing the lever 70, the valve stem 34 may be moved to the left or right. The spring 66 will, of course, tend to move the lever to the full line position of FIG. 2. The portion 74 of the handle is formed with a slot 76, FIG. 4, having offset stop station recesses 78 and 78', intersecting the slot. The lever projection 80 extends into the slot 76 and by moving the projection into one of the stop station recesses 78, the actuating lever 70 may be maintained in either the partially opened station 78 or the fully opened station 78'. The dotted line position of projection 80 shown in FIG. 4 represents the full open position of the actuating lever. Thus, the valve may be maintained in an open position without constant attention by the operator.

The tank or container self-sealing fitting half 82 is best shown in FIGS. 1 and 3, and preferably consists of a tubular body 84 having threads formed at 86 whereby the body may be affixed into a threaded opening 88 of the container 90, represented by the dotted lines. The body 84 is provided with an axial bore 92 having one end thereof tapered as at 94, and threads 96 are formed on the exterior surface of the body adjacent the open end. An annular valve seat 98 located at right angles to the axis of the bore 92 is formed on the body, and a plurality of ports 100 are defined in the wall thereof. A cap member 102 is threaded to the end of the body 84 and is provided with an axial hole 104 permitting the valve stem 106 to pass therethrough. The valve stem 106 is provided with a threadedly mounted seal retainer 108 for maintaining the annular resilient seal 110 upon the valve stem. The compression spring 112 is interposed between the cap 102 and the valve stem 106 to continuously bias the valve stem to the right normally maintaining engagement of the seal 110 and seat 98, thereby closing the fitting to the passage of fluid therethrough. It will also be appreciated that the fluid pressure within the container augments the closing of the valve.

In operation, the valve body 10 and bores 13 and 18 will be in communication with the pressurized fluid supplied from the flexible supply conduit, not shown. The spring 66 will maintain the seal ring 40 in engagement with the valve seat 24 and as the diameter of the valve stem lip 64 is slightly greater than the diameter of the valve stem head 36 exposed to the fluid within the valve body, a differential piston or area arrangement is produced wherein the fluid pressure within the bore 18 augments the force of the spring 66 to maintain the valve stem and valve seat in the closed position. The valve components will thus be in the position shown in FIG. 2, and it will be noted that the diaphragm 60 is backed or supported by the cap recess 62 to prevent the fluid pressure from within the bore from excessively deforming the diaphragm.

When it is desired to connect the manually operated valve to the fitting 82, the axis of bore 18 is aligned with the axis of the body 84, and the valve body 10 is moved toward the fitting 82 and sleeve 22 is received within the tapered portion of bore 92 thereof. The tapered surface 94 facilitates the assembly and the valve seat sleeve 22 may be partially received within the fitting until the threads of the nut 28 contact the threads 96 of the fitting. Thereafter, the nut 28 is rotated to engage the threads and insert the valve seat sleeve 22 further into the bore 92, and the nut is tightened until the sleeve flange 26 abuts the end of the fitting, as shown in FIG. 3. At this time, the seal retainers 38 and 108 will be in abutting engagement, and the engaging surfaces of these retainers are formed complementarily whereby air or other matter is substantially excluded therebetween.

The connection is now complete, and the operator may now move the actuation lever 70 toward the handle 74 to shift the valve stem 34 to the left. This action also moves the valve stem 106 of the fitting 82 to the left to establish communication of the bore 18 with the ports 100, and the fluid will flow into the container through the ports. The operator may position the actuating lever projection 80 into either of the stop stations 78 or 78' if it is desired to maintain the fluid flow into the container without personal attention by the operator. It will be noted that as the ports are arranged at right angles to the axis of the fitting 82, it is possible to provide ports of relatively large area and, hence, of low flow resistance characteristics, in a relatively small fitting.

When it is desired to disconnect the valve 10 from the fitting 82, the operator releases the lever 70 from the holding station and permits the lever to return to the full line position of FIG. 2. The compression spring 66 will move the valve stem 34 to the right as the lever 70 is released, and the seal ring 40 will once again engage the seat 24, and the seal 110 will engage the seat 98, thereby closing the valve 10 and fitting 82, respectively. The nut 28 is then unthreaded from the fitting threads 86 and the valve 10 may be removed from the fitting. As the seal retainer surfaces of the valve body and fitting closely engage with complementary surfaces, there will be no loss of fluid upon disengagement.

It will be thus appreciated that the invention produces a valve wherein fluid pressures are used to augment and maintain the closing of the valve and manual valve movement is employed to open a self-sealing fitting. The construction and relationship of the valve components is such that very viscuous fluids, for instance, molasses, may be handled by the apparatus of the invention, and the dimensions of the valve stem 34 in relation to the bore 18 is such that little fluid resistance is produced by the valve 10 as the fluid flows therethrough, restrictions of small area having been eliminated. While it is recognized that an O-ring or other receiving means could be employed in place of the diaphragm 60, the diaphragm is preferred in this type of construction in that a lower friction between the valve stem and valve body is produced and the diaphragm also facilitates cleaning of the valve, an important feature when handling foods such as molasses or syrup. The configuration and port arrangement of the fitting 82 provides maximum flow characteristics for a given fitting diameter; however, it will be appreciated that the fitting may be made of a larger diameter and the ports rearranged whereby the fluid flow therethrough is in an axial direction.

It will be understood that the invention is not limited to the disclosed embodiment, and that various modifications may occur to those skilled in the art, without departing from the spirit and scope thereof.

I claim:

1. A manually operated coupling comprising a pair of interconnectable valve assemblies, one of said valve assemblies comprising in combination, a first valve body, a bore in said valve body, means establishing communication between said bore and a source of pressurized fluid, a first valve stem coaxially supported within said bore and axially movable therein, a valve seat associated with said bore, a first valve head defined on one end of said valve stem selectively enagageable with said valve seat controlling the flow of fluid through said bore, an enlarged portion defined on the other end of said valve stem having an area subjected to the fluid pressure within said bore slightly greater than the area of said valve head subjected to fluid pressure within said bore, a flexible annular diaphragm affixed to said valve stem adjacent said greater area and said valve body defining a seal between said stem and body and manually actuated means operatively associated with said valve stem selectively axially positioning said stem, the other of said valve assemblies comprising a second valve body, an axial bore within said second valve body, a second valve seat associated with said axial bore, a second valve stem axially movable within the bore of said second body having a valve head selectively engageable with said second valve seat, ports in said second valve body communicating with said second bore, means biasing said second valve stem toward said second valve seat and means connecting said first valve body to said second valve body whereby the axes of the bore of said first body and said second bore coincide and axial movement of said first valve stem to the open position abuts the valve head of said second stem opening said second valve assembly permitting fluid flow through said bores and ports, said last mentioned means comprising a nut member rotatably mounted on said first valve body and threads formed on said second valve body cooperable with said nut member.

2. A coupling comprising a pair of interconnectable first and second valve assemblies, said first valve assembly comprising in combination a first valve body, a bore defined within said body communicating with a source of pressurized fluid, a valve seat adjacent one end of said bore, a valve stem having a head selectively engageable with said seat axially movable within said bore, manually operable means operatively associated with said valve stem for the axial positioning thereof, said second valve assembly comprising in combination a second valve body having a bore defined therein, a valve seat defined in the bore of said second body, a valve stem axially positionable within the bore of said second body having a valve head biased toward and engageable with said last mentioned valve seat, means interconnecting said first and second valve assemblies whereupon actuation of said manually operable means to shift the valve stem and head of said first valve body to permit fluid flow therethrough also axially displaces the valve stem and head of said second valve body establishing communication between the bores of said first and second valve bodies, said valve stem within said first valve body including an area subjected to the fluid pressure within the associated bore of a slightly greater area and in opposed relation to the area defined by the associated valve head subjected to said fluid pressure whereby the fluid pressure differential acting on said areas tends to maintain the valve head and seat of said first valve body engaged, and spring means interposed between said first valve body and the valve stem therein biasing the head of the stem toward the valve seat within said first body.

References Cited in the file of this patent
UNITED STATES PATENTS

| | | |
|---|---|---|
| 121,487 | Burnett | Dec. 5, 1871 |
| 297,569 | Casey | Apr. 29, 1884 |
| 1,633,642 | Kramer | June 28, 1927 |
| 2,112,146 | Di Giovanni | Feb. 8, 1937 |
| 2,473,223 | Scheiwer | June 14, 1949 |
| 2,556,221 | Samiran | June 12, 1951 |
| 2,630,338 | Snyder | Mar. 3, 1953 |
| 2,770,256 | Krapp | Nov. 13, 1956 |
| 2,772,706 | Petau | Dec. 4, 1956 |